Patented Apr. 15, 1941

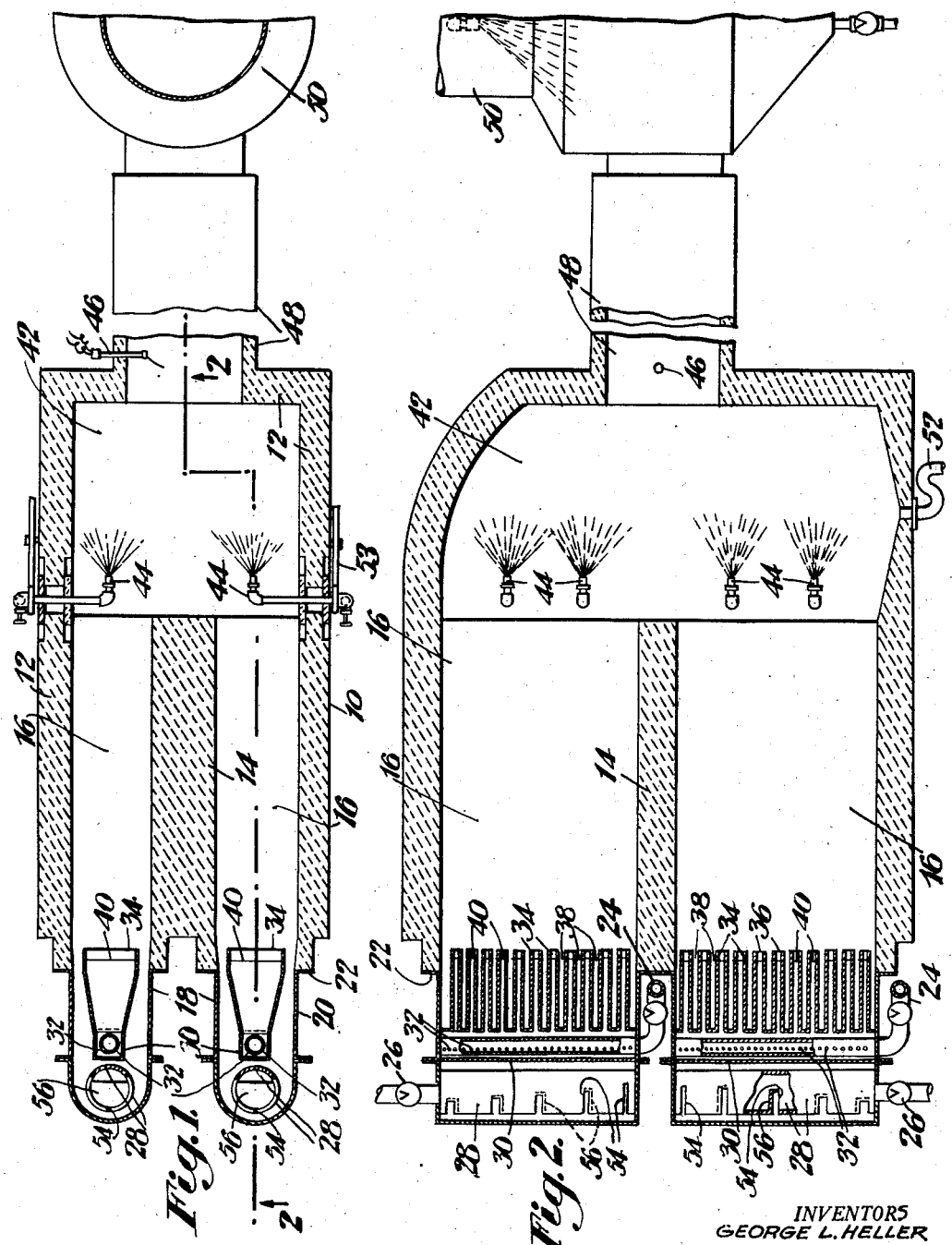

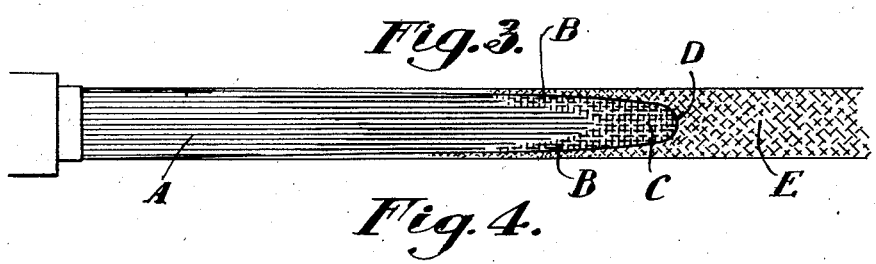
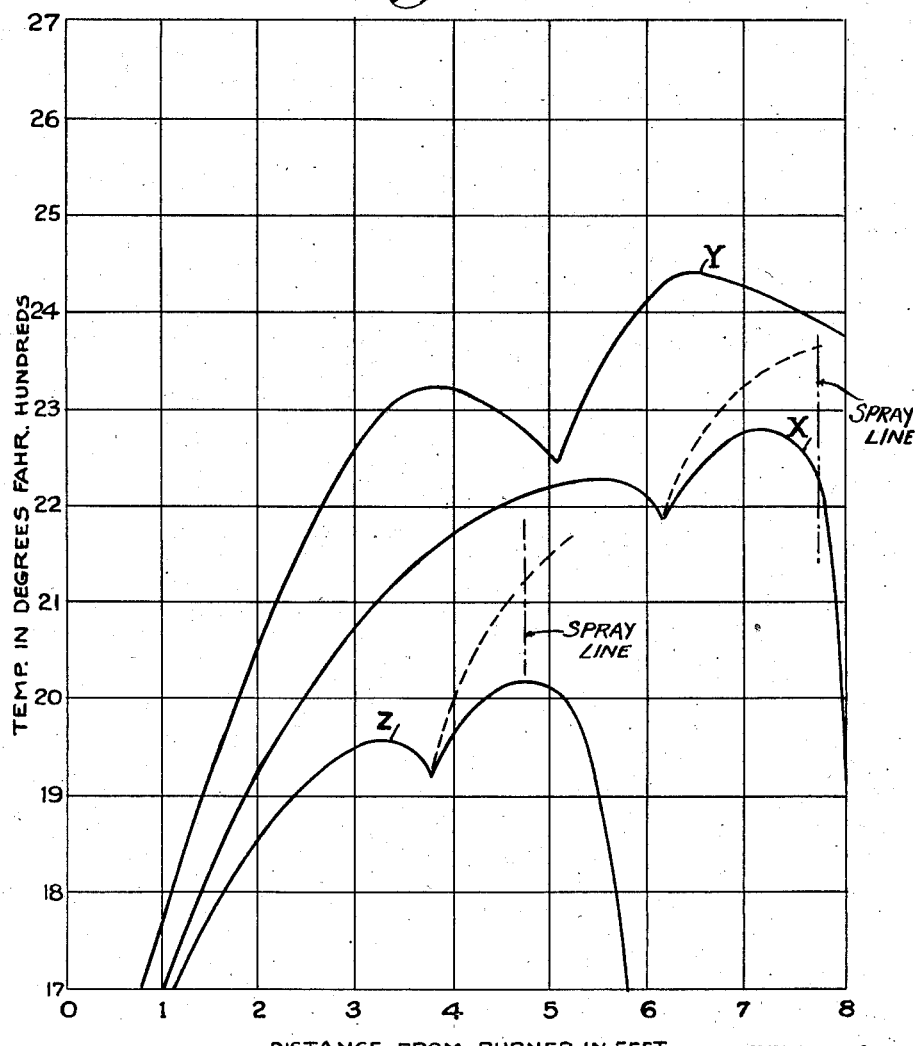

2,238,576

UNITED STATES PATENT OFFICE 2,238,576

CARBONACEOUS PIGMENT AND PROCESS OF MANUFACTURE

George L. Heller and Carl W. Snow, Pampa, Tex., assignors to General Atlas Carbon Company, Dover, Del., a corporation of Delaware Application May 26, 1937, Serial No. 144,786

8 Claims. (Cl. 134—60)

The present invention relates to carbonaceous rubber reenforcing pigments and more particularly to a solid, finely-divided hydrocarbon pigment and process of manufacture.

The primary object of the present invention is to provide a new carbonaceous rubber reenforcing pigment which shall have certain combinations of properties which the best grades of commercial carbon black lack. For example standard rubber formulae incorporating the new pigment have many desirable properties including those of a low modulus (i. e., low tensiles necessary for elongation to 300% and 500% of original length) a high resistance to tearing, and a high ultimate tensile strength. The improved solid hydrocarbon pigment which forms the subject of the present invention is black in color, is made up of individual particles the majority of which are sub-microscopic in size, and yet differs markedly in its chemical structure and properties from any commercial carbon black, having an empirical formula corresponding substantiall to $C_{13}H_n$ (in which $n$ ranges in value between 8 and 20). The new pigment will react with fuming sulfuric acid and other reagents which show little or no reaction with any commercial carbon black.

Most of the carbon black at present produced in this country is made by the incomplete combustion of a hydrocarbon gas (usually natural gas) in a large number of small burners, the flames of which impinge on a comparatively cold metal channel or plate. The yield of so-called channel black produced by the impingement process per 1000 cu. ft. of natural gas used in its production is relatively small, amounting in commercial plants to only about 3½% of the available carbon present in the gas treated. However, this channel black has a high color value and possesses more desirable physical properties for rubber reenforcing than any other available type of carbon black.

Another method of manufacturing carbon black which is in commercial use is that known as the thermal decomposition method. According to this method the hydrocarbon gas is decomposed without partial combustion by contacting the gas with hot checker brick or other solid surfaces which have been previously heated to a temperature above the dissociation temperature of the hydrocarbon. The carbon black produced by thermal decomposition is of lower grade, in comparison with channel black, in many of its physical properties, although the yield of black which is obtainable by the thermal decomposition method may be as much as 25% of the available carbon present in the gas treated.

The process of making the new carbonaceous rubber reenforcing pigment which forms the subject of the present invention has been developed as an improvement on a third basic method of producing carbon black which is described in the U. S. patent of David J. Beaver No. 1,902,753, patented March 21, 1932; U. S. Patent No. 1,999,- 541, Theodore P. Keller, patented April 30, 1935; and, in our copending United States patent application Serial No. 87,657 for Manufacture of carbon black. The inventions of the Beaver and Keller patents and of the Heller and Snow application above referred to, are all based on the discovery that carbon black can be produced in high yield by incomplete combustion of natural gas within a combustion chamber into which the gas and air are directed in a plurality of alternate thin wide contacting sheets while thin viscous flame fronts are formed and maintained around each sheet of gas as the gas and air move forwardly through the combustion chamber in parallel streamline non-turbulent relation out of contact with solid or liquid surfaces. The carbon blacks which are produced by the processes of the Beaver and Keller patents and of the aforementioned Heller and Snow application, possess color values and other physical properties which are intermediate those of channel black and of the black produced by the thermal decomposition method hereinabove referred to.

Another object of the present invention is to provide improvements in method whereby the basic principle of the processes described in the Beaver and Keller patents and in the aforementioned Heller and Snow application can be applied to produce high yields of a finely divided solid hydrocarbon rubber reenforcing pigment possessing certain physical characteristics which for certain rubber reenforcing purposes represents an improvement on the corresponding properties of channel black.

The generally accepted present theoretical conception of both the channel process and the thermal decomposition process is that of a straight decomposition of methane to yield carbon and hydrogen in accordance with the formula $CH_4 \rightarrow C + 2H_2$. According to this theory the carbon black produced by any process would be atomic, and apart from the size of the agglomerates, should possess properties identical with the properties produced by any other process. However, it is well-known that the carbon blacks produced by different processes have widely different properties, and that the blacks produced by more efficient thermal processes can not compete with channel black in the broad field of rubber reenforcing.

The present invention is based in part on the discovery that an improved black, finely-divided, solid hydrocarbon powder adapted for use as a rubber reenforcing pigment can be produced in high yield when a hydrocarbon gas is subjected to a streamline partial combustion treatment of the general type described in the aforementioned Beaver and Keller patents, under controlled conditions of burner size and flame length whereby the gas within each flame is subjected successively to cracking to produce unsaturated hydrocarbons of the acetylene and olefine series, followed by polymerization to produce high boiling aromatic hydrocarbons which are in turn only partially dehydrogenated to yield solid hydrocarbons. A suitable pigment imparting to rubber compounds a low modulus at 300% and 500% elongation is obtained by subjecting the gaseous products of the dissociation reaction to rapid quenching at a point within a few inches beyond that at which such solid hydrocarbons are first formed in the gas stream which is discharged from each burner.

With the above and other objects and features in view, the invention consists in the improved carbonaceous rubber reenforcing pigment and process of making same which is hereinafter described and more particularly defined by the accompanying claims.

In the drawings forming part of this specification there have been illustrated somewhat diagrammatically a preferred design of apparatus for carrying out the claimed process.

In the drawings—

Fig. 1 is a plan view, with parts shown in horizontal section, illustrating a partial combustion furnace adapted for the production of the improved rubber reenforcing pigment;

Fig. 2 is a view in vertical elevation, with part shown in section, taken on the line 2—2 of Fig. 1;

Fig. 3 represents an attempt at illustration in black and white of the variously colored typical reaction zones in a single flame producing pigment by streamline partial combustion of natural gas; and Fig. 4 plots several curves showing temperature-flame travel relationships developed in producing carbonaceous pigments of varying properties by streamline partial combustion.

Referring to the drawings, the numeral 10 designates a carbon black furnace having refractory insulating walls 12 and embodying vertically and horizontally disposed partition walls 14 which divide the forepart of the furnace into several individual combustion chambers 16 having their major axes horizontal. Burner elements 18 corresponding in number to the number of combustion chambers 16 are mounted at the vertical front wall of furnace 10. Each burner element 18 has a casing 20 which is dimensioned to fit the front end of one of the combustion chambers 16 and which is attached to the front wall of the furnace by flanges 22. These burner elements serve as hydrocarbon gas and air supply ducts for the furnace, and are disposed on the front wall of the furnace to afford ease of access for purposes of rapid removal, cleaning and replacement.

The hydrocarbon gas which is to be used as a source of rubber reenforcing pigment is conducted by individual valved feed lines 24 to each of the burner elements 18. Air for supporting partial combustion of the gas within the furnace is conducted through control gates 26 to individual air supply pipes 28. Pressure regulating valves and flow meters (not shown) are connected in the main gas and air supply pipes to assist the operator in maintaining the desired ratio of gas and air.

Within the burner elements 18 the individual gas supply pipes 24 are enclosed by a vertical gas supply manifold 30 which is conveniently constructed in the form of a rectangular box. Manifold 30 forms a part of the gas burner and within this manifold the corresponding pipe 24 is drilled with two rows of small apertures 32 (1/8") facing at an angle toward the back of the burner. The total area of the apertures 32 is less than 75% of the cross sectional area of pipe 24, and these apertures form a series of small orifices which distribute the gas evenly throughout the length of the manifold 30. The gas impinges on the manifold 30 and reverses its flow toward the burner, entering spaced parallel burner ducts 34, each of which forms the gas into a thin wide sheet issuing from each tip 36. In one operating furnace the burner is built up of a large number (43) of ducts having chrome steel tips about 3/32" thick and 9" wide (inside dimensions) uniformly spaced about 0.8" and discharging into a combustion chamber 12" wide, 36 inches high and 6'9" long.

The air sheets enter the combustion chamber from slots 38 between the gas burner ducts. Ducts 34 are broadened or flattened out in front of and adjacent manifold 30 so that, as illustrated in Fig. 1, their width is about 2 to 4 inches less than the width of the combustion chamber 16. The spaces which lie between adjagas ducts 34 and between the edges of the ducts and the walls 14 of the combustion chamber serve as air passages surrounding each gas duct and distributing air for combustion equally between all the gas ducts. By this burner construction the air and gas supplies to the furnace are directed in parallel streamline flow before the air and gas come into contact within the individual combustion chambers 16.

Since the forward ends of the burners 34 are exposed to high temperatures, they are fitted with tips 36 adapted to withstand the high temperatures without warping or oxidation and without catalytic decomposition of the gaseous hydrocarbon flowing therethrough. A chromium steel or alloy of chromium and iron containing 25% or more of chromium, is the preferred material for the burner tips. An alloy of lower chromium content (12%) may be used for the burner vane construction. Tips 36 are secured to the vanes of the burner ducts 34 by socket or welded joints indicated by the numerical designation 40.

The mixture of flue gases laden with hydrocarbon black which is produced in each of the combustion chambers 16 of the furnace 10 discharges into a common large blending chamber 42 at the rear end of the furnace where the hot gases immediately contact finely atomized quenching water supplied to the chamber 42 by sprays 44. The flue gases are thereby rapidly cooled within chamber 42 to a temperature below 1200° F., and preferably to a temperature between 950° F. and 1100° F. as recorded by a thermocouple 46 located at the inlet end of gas off-take pipe 48. In one such furnace the total distance from the burner tips to the inlet end of pipe 48 is approximately 12 feet. From the blending and cooling chamber 42 the gaseous reaction products, carrying finely divided solid hydrocarbon black in suspension, pass through off-take pipe 48 into a secondary cooler 50 where the temperature of the gases is finally reduced, by contact with atomized cooling water, to a temperature below 500° F. The rubber reenforcing pigment of the present invention may then be recovered from the gases by electrical precipitation or bag filters.

The initial cooling to which the products of reaction are subjected in the primary cooling and blending chamber 42 is very well accomplished by water sprays, although even more efficient cooling can be effected by liquefied inert gases such as liquid nitrogen where feasible. The secondary cooling which takes place in the chamber 50 is preferably accomplished with water sprays in order to add the moisture which is desirable as an aid to the precipitation of the product in an electrical precipitator. A trap 52 is provided at the base of chambers 42 for the purpose of removing any unvaporized liquid.

As the gas travels forward from a burner tip into and through the combustion chamber, the hydrogen which is liberated by the various cracking reactions diffuses more rapidly than the hydrocarbon into the air stream moving along in contact with the gas stream. By following the streamline method of combustion the hot gas within each flame front has a comparatively high viscosity, so that the solid hydrocarbons which are formed by the heat developed within the gas on the inside of the flame front by cracking, polymerization and dehydrogenation, are substantially all held against the inner face of the viscous flame and pass forwardly through the furnace into the blending chamber 42 in a definite nonturbulent flow of streamline character, without coming in contact with solid surfaces. By this method of operation the pigment passes rapidly through the high temperature reaction zone without becoming oxidized and without becoming graphitized by too long exposure to high temperatures.

One of the important factors in controlling the character of the finely divided hydrocarbon black product is the thickness of the individual gas streams which are introduced into the combustion chamber 16. To produce a suitable solid hydrocarbon pigment, the individual ducts 34 and tips 36 of the gas burner should be dimensioned with an inside thickness in the range 1/8–1/4 inch, and with a width varying between 6 and 10 inches.

The optimum ratio of air duct to gas duct thickness when practicing the present invention is about 4.35 when supplying ordinary natural gas of a heating value in the neighborhood of 1000 B. t. u. per cu. ft. to the furnace for conversion to rubber reenforcing pigment. A preferred cross sectional area ratio of air ducts to gas ducts is about 6.5. It has been found that streamline flow of gas and air through the combustion chamber 16 can be maintained with the velocity ratio of the air and gas entering the combustion chamber at the plane of the burner tips in the range 1–2½. It is the viscosity of the flame sheath enclosing each gas sheet within the combustion chamber which allows such a high velocity ratio of the air and gas without developing turbulent flow.

In order to insure uniform distribution of the air throughout the entire cross section of the burner the portion of each of the air distributors 28 within the burner element is provided with slots 54 of uniform area but increasing length and baffles 56 of gradually increasing length along the length of the distributor between the point of air entrance and the end of the distributor. In this way the relative volumes of the gas and air are regulated to secure uniform distribution throughout the height of the burner when supplying the air under pressure to the distributor.

Relative proportions of air and gas are preferably controlled to obtain as nearly as possible an optimum volume ratio of about 8.5 when treating 1000 B. t. u. natural gas. However this volume ratio may be varied over a wide range in adjusting the operation of the furnace to vary the production capacity and to treat gases of different calorific value. For instance, the air-gas ratio may be varied over the range 8–24 when burning gases of 1000–2000 B. t. u., although the optimum ratio lies in the range of 50% to 80% of the volume of air theoretically necessary to effect complete combustion of the natural gas originally supplied.

The rubber reenforcing pigment of the present invention is produced in best yield when maintaining a maximum temperature within the furnace in the range 2000° F.–2350° F., the optimum being in the neighborhood of 2300° F. This temperature is registered by thermocouples located in the walls of combustion chamber 16 (not shown). The temperature thus registered is not the actual flame temperature, but approximates the flame temperature because of the large amount of radiant energy which is efficiently utilized in effecting reactions of the gas. This efficient utilization of the energy developed by the flame is obtained by so arranging the burners that the largest possible surface of any flame radiates to another flame and not to a solid wall. In other words, a plurality of burners capable of producing thin, broad and flat flames are employed in order to insure formation of a maximum amount of hydrocarbon black within each flame through activation by direct radiation from other flames.

Experience has shown that one of the principal factors which has to be considered in operating in accordance with the process of the present invention so as to produce a solid finely divided hydrocarbon black is that of the time of exposure of the hydrocarbon black resulting from dissociation to high temperature within the chambers 16 and 42. It is likewise important and desirable that the absolute velocity at which the gas is passed through the combustion chambers shall average in the neighborhood of 14 ft. per second. However, it is flame length which is a most important factor, for the reaction zones shift but slightly with velocity changes. The quenching sprays should be located at a distance of only about 4.5–8.0 ft. from the burner tips. This insures that a period of not substantially more than one-half second shall elapse between the time that a unit volume of the gas is introduced into the combustion chamber 16 from a burner tip and the time when the gaseous and solid products of reaction have passed through the high temperature zone into a temperature zone below 1200° F. This means that the solid finely divided hydrocarbon black which is formed in the high temperature zone of the flame is not subjected to temperatures above 1500 F. for a period substantially in excess of .2–.5 second after its formation. Any substantial increase in the above specified times of exposure of gases and produced hydrocarbon black within the high temperature dissociation zone results both in a corresponding decrease in the yield of the black and in the quality of black recovered.

At a point in the gas flame immediately preceding that of which solid particles are formed, hydrocarbons exist which are not gaseous at the existing temperature and which are present in the flame in the form of a fog. The size and character of these fog droplets depends upon the rapidity of their formation, the free radicals from which they are derived by polymerization, and the chemical structure of these radicals. Dilution of the gas in this portion of the flame results in decreasing the probable association of these free radicals, and thereby decreases the amount of hydrocarbon converted into a liquid phase as well as decreasing the size of the droplet for a given flame thickness. Factors such as velocity of flame travel, temperature, hydrocarbon-air concentration, and thickness of gas stream, all affect the rate of free radical formation and the rate of polymerization, and are thereby reflected in the chemical composition and properties of the final product produced. The rubber reenforcing pigment of the present invention is any one of a large number of such products of different properties that can be produced as a result of inhibiting substantial further alteration of the original solid product produced in the flame during its subsequent travel with the flame beyond the point of formation. This inhibiting action is effected by rapidly quenching the products of reaction below a definite temperature in the neighborhood of 1000 degrees F.–1200 degrees F. as soon as possible after the original solid product is formed.

One of the most effective methods of controlling the character of the solid hydrocarbon black formed is by adjusting the air-hydrocarbon ratio of the gas and air supplied to the burners and the point of application of quenching water so as to produce a solid hydrocarbon black having an acetone extractable content above 1% and preferably in the range 2% to 5%. By acetone extractable is meant that the product is subjected to extraction with hot acetone for 24 hours in a Soxhlet extraction apparatus and then dried and weighed, the loss in weight representing the per cent. extracted. Apparently it is the retention of this acetone extractable content which protects the solid hydrocarbon black against degradation and dehydrogenation by a buffer action. By varying the volume ratios of gas and air, the length of the flame, and the point of application and temperature of quenching, products have been obtained varying in empirical formulae from $(C_{83}H_8)_x$ to $(C_{83}H_{20})_x$.

Careful examination of the flame developed by a black burner such as employed in this process, reveals at least 5 color zones in the flame. Close to the burner tip (Fig. 3) is a region A of pale blue color which shades into a darker zone. Beyond this there is a transition to a transparent yellow B, then a further transition into an intense yellow C. The end of the yellow zone is very sharp and is defined by a narrow dark band D. Beyond this narrow dark zone is a darker orange-yellow opaque region E. The flame produced by the burner is encased in a pale blue luminous sheath of burning carbon monoxide and hydrogen. Tests which have been made show that when the bright yellow zone of the flame is rapidly cooled, the yield of black solids is practically nil. The small amount of product which is obtained is brown in color and rich in soluble tarry substances. When the orange zone of the flame is quenched at varying distances from D, black solids are obtained which vary in properties with distance.

While it is impractical to study the reactions which take place by attempting to take samples of gases from the flame, satisfactory results were obtained by actually varying the distance between the burner tip and the quenching nozzles. As illustrated in the drawings, the distance between the nozzles and the burner tips is adjustable by means of nozzle adjusting mechanism 53. The introduction of quenching liquid through the nozzles serves to rapidly cool the products below the temperature at which they will further react, so that the product produced in a flame of any length can be then taken and analyzed. Similar results have been duplicated in an electrically heated alloy tube under corresponding conditions of time and temperature, when producing a hydrocarbon black by indirect heating rather than by partial combustion. The term "flame travel" is used herein as an expression measuring the distance from the burner tip to the point in the flame just beyond the break where the first solid non-volatile hydrocarbon appears in the flame.

In Figs. 3 and 4 the reaction mechanism has been reconstructed and shows that zone A within the flame is a heating zone in which the hydrocarbon vapor is heated and thermally activated. Zone B is the zone where free radical formation takes place (i. e., cracking) and in zone C the free radicals recombine and build up to form heavy unsaturated and polymerized products. Thus in the latter portion of zone C large quantities of naphthalene, anthracene, pyrene, and heavy tars are formed and have been identified after their recovery by adsorption on activated charcoal. Zone D is a very short zone following zone C in which the heavy aromatic polymers apparently lose hydrogen and at the same time build up by accretion to larger molecular structures. The drop in temperature in zone D is due to endothermic dehydrogenation. Following this break in the curve at zone D there is a rapid temperature rise which is apparently the result of the combustion reactions between residual oxygen in and about the flame sheath and hydrogen liberated during the dehydrogenation reaction in zone D.

Beyond the dehydrogenation zone D there exists within the flame a solid phase in suspension associated with some of the unchanged liquid phase. The reactions proceeding in zone D do not go to completion entirely, but a large proportion of the hydrocarbons present prior to this point lose hydrogen at this zone. In zone E, therefore, there exists the initial product, a finely-divided solid derived from minute droplets of the liquid phase and also some unchanged liquid.

For a short distance (approximately 6 to 18 inches) beyond D no appreciable change occurs in the solid phase. The residual tarry liquids act as buffers and are converted to the solid phase. But, when these tarry substances are reduced to below 2% to 5% of the solid phase, the solid is attacked and suffers dehydrogenation unless the temperature is reduced to a point where the solid phase is thermodynamically stable for short periods. This is accomplished by quenching at the proper point, and the quenching spray reduces the temperature and at the same time creates a turbulence and mixing of the combustion and reaction products thereby further inhibiting the danger of accretion or growth.

Curve X in Fig. 4 plots a temperature traverse of the flame depicted in Fig. 3 along the longitudinal axis of the flame when producing from natural gas of 1000 B. t. u. a hydrocarbon black to which the designation "Chemical Black A" is applied in the following tables. A continuation of curve X which is plotted in dotted lines beyond the break in the curve shows the temperatures which are developed beyond the break when no quenching spray cut-off is used at the end of the combustion chamber. Curve X was plotted from the flame of a burner approximately ¼" in thickness operating with an air gas ratio of 8 to 1 while supplying gas and air to each combustion chamber 16 of the furnace at a rate of 3300 cu. ft. of gas and 27,200 cu. ft. of air per hour. The products of reaction were quenched by applying water at the rate of 100 gallons per hour through two ¼" 90° sprays operating under 100 lbs. pressure and located at a distance of about 7½ ft. from the burner tip. The flame plotted in curve X produces a solid product having approximately the empirical formula $C_{83}H_9$.

Curve Y plots a flame traverse of a somewhat shorter flame operating with a lower air-gas ratio than the flame depicted in Fig. 3. The flame depicted by curve Y produces a hydrocarbon black having substantially the empirical formula $C_{83}H_8$. Application of quenching liquid water to this flame occurs at a distance of about 8½ ft. in front of the burner tip, with the result that the temperatures developed are considerably higher than those plotted in curve X.

Curve Z plots another traverse of a still shorter flame which is quenched by a spray located at a distance of only 5 ft. from the burner tip. The gas velocities in the flame plotted by curve Z are higher, and the temperatures developed lower, than those of the flame plotted in curve X. The low modulus black which is produced by the flame of curve Z has substantially the empirical formula $C_{83}H_{15}$ and the properties of this black are listed in the following tables under the designation "Chemical Black C." The air gas ratio which was employed in developing the flame plotted in curve Z was approximately 24 to 1.

Experimental evidence distinguishing this new product from all other rubber reenforcing pigments is primarily of a chemical nature. This new product possesses combined hydrogen in the average ratio of $C_{83}H_{15}$, will react with alkaline potassium permanganate, with fuming sulphuric acid forming a self-dispersing sulphonated solid, with nitric acid, benzyl chloride and many other reagents to yield a variety of products with varying properties. Further, this new product will ignite in air at temperatures 200° F. or more below other black pigments.

From the commercial aspect, the principal distinguishing features are the combination of low modulus at 300% elongation, high tensile strength at rupture, exceptional resistance to tearing and excellent resistance to deterioration by aging when compounded in rubber. These are properties highly desirable for such products as inner tubes, footwear, etc., and not found in any other known pigment in the same degree.

In the following tables the properties of the reenforcing pigment of the present invention are compared with the corresponding properties of some well known commercial carbon blacks:

*Physical and chemical properties*

| | Moisture | Acetone extractable | Tinting strength | Tone | Oil absorption |
|---|---|---|---|---|---|
| | | | | | Percent |
| Micronex | 3.0 | 0.01 | 100 | 75 | 117 |
| Gastex | 0.05 | 0.1 | 40 | 40 | 68 |
| Thermal decomposition | 0.1 | 0.1 | 14 | 0 | 35 |
| Chemical Black "A" | 0.2 | 2.0 | 58 | 60 | 82 |
| Chemical Black "B" | 0.15 | 4.6 | 75 | 66 | 125 |
| Chemical Black "C" | 0.1 | 7.5 | 78 | 67 | 135 |

In the above table the micronex black is a good grade of commercial channel black. Gastex black is a black produced without rapid quenching by the process the basic principles of which are described in the Beaver and Keller patents above referred to. The thermal decomposition black is produced by carrying out the dissociation of natural gas in contact with highly heated checkerbrick on an intermittent cycle. Chemical blacks "A", "B" and "C" are three hydrocarbond blacks which can be produced by the present method.

In making the moisture test a sample of the material (approximately three grams) is weighed into an alundum extraction thimble and oven dried at 105° C. for four hours. The acetone extractable is obtained in the manner which has already been indicated. The tinting strength is obtained by mulling together two grams of zinc oxide, 0.75 gram of raw linseed oil, and 0.1 gram of the pigment for 100 rubs, and comparing the shade of the resulting mixture with that of a standard on a smooth glass slide. The standard is then increased or decreased until no demarkation can be found on "drawing down." Mass tone is an arbitrary value which is determined by the observer, and signifies the relation of intensity of color when the pigment is mixed with sufficient raw linseed oil to form a thin paste and viewed through a glass slide in comparison with a standard color chart. The oil absorption value is obtained by weighing out two grams of the pigment and mixing with linseed oil supplied from a calibrated pipette until the mass will just adhere. The per cent. absorption represents the weight of oil to weight of pigment.

In the following table certain properties of the improved chemical blacks are compared with those of some standard carbon blacks, such properties being those imparted to a standard rubber mixture containing the black as a reenforcing pigment. All of the following tests were conducted using the formula smoked sheet 100, zinc oxide 5, reenforcing pigment 40, sulfur 3, stearic acid 4, captax (mercaptobenzothiazole) 1, B. L. E. (ketone-amine anti-oxidant) 1. All cures except the first were made at 274° F. for 30 minutes.

The first cure on Micronex was made at 274° F. for 45 minutes.

Rubber tests

| | Cure | Mod. 300% | Mod. 500% | Hard | Tear | Break | Elongation |
|---|---|---|---|---|---|---|---|
| Micronex | 45 | 1120 | 2800 | 65 | L. 55.0 / C. 56.7 | 4800 | 687 |
| Do | 30 | 730 | 2700 | 62 | L. 56.2 / C. 51.6 | 4100 | 727 |
| Gastex | 30 | 1020 | | 60 | L. 32.1 / C. 36.8 | 3900 | 670 |
| Thermal decomposition | 30 | 530 | 1800 | 57 | L. 33.5 / C. 36.4 | 3800 | 703 |
| Chemical Black "A" | 30 | 640 | | 62 | L. 41.0 / C. 46.8 | 3890 | 683 |
| Chemical Black "B" | 30 | 590 | 1500 | 65 | | 3890 | 697 |
| Chemical Black "C" | 30 | 560 | | 62 | L. 53.4 / C. 52.5 | 4070 | 727 |

From the above data it will be noted that the new chemical black of the present invention possesses certain properties which are very desirable in a rubber reenforcing pigment. For example the new black has a modulus of 500–650 lbs. at 300% elongation, about 1500 lbs. at 500% elongation, an ultimate tensile of about 4000 lbs. with an elongation of over 700%, and a resistance to tear at least as good as the best grade of commercial channel black at the same cure.

In the above tests the modulus refers to the tensile load which is necessary to produce a definite elongation, and is recorded in pounds per square inch based on the undeformed original cross sectional area of the test piece. The tensile or ultimate tensile is the load necessary to cause rupture of the cured stock, and is measured in the same manner as modulus. Elongation is given in percentage of increase in length of a test piece which is possible before rupture. Hardness is an arbitrary value measured by the amount of penetration of a blunt needle. The softer the stock, the lower the penetration. Cure is the time necessary or used to cause combinations of the ingredients, and for test purposes a range of cures are usually made at a specific temperature, usually in a steam heated platen. The tear test is given in terms of the actual tensile load required to pull apart and tear a dumbbell shaped test piece which has been notched with small cuts to start the tear. In making the tear tests the dumbbell sample pieces are cut from the cured sheet, one sample being cut across the direction of milling and the other sample with the grain.

The new hydrocarbon black weighs about 10–20 pounds per cubic foot, and has a permanent set of about 38 and an abrasion resistance in standard rubber formulae which is about 20% less than that of commercial channel black. The high acetone extractable content apparently consists largely of tarry substances which can be removed either by extraction with hot acetone or by prolonged heat treatment at a temperature in the range 450° F.–1000° F. The acetone extractable portion of the product may run as high as 20%—but its removal has no substantial effect on the rubber reenforcing properties of the product. In other words it is apparently the acetone insoluble hydrocarbon component of the product which is responsible for the properties of low modulus and high tensile.

The invention having been thus described, what is claimed as new is:

1. The process of manufacturing hydrocarbon black which comprises directing a plurality of spaced wide sheets of hydrocarbon gas of about ⅛″–¼″ thickness into a combustion chamber, simultaneously directing into the combustion chamber a sheet of air on each side on each gas sheet, adjusting the relative flow velocities and volume ratios of the air and gas sheets to maintain viscous streamline partial combustion and formation of solid hydrocarbon within each gas sheet at a distance of about 3½–6½ feet from the point at which the air and gas sheets first contact within the chamber, intimately contacting the gaseous reaction products with a fine spray of quenching liquid at a point spaced about 4½–8 feet from the point at which the air and gas sheets first come in contact, permitting the gaseous and solid products of combustion to expand into an enlarged cooling and blending chamber at about the time that the gas contacts the quenching liquid, and regulating the temperature and volume of the quenching liquid to thereby promote rapid quenching below a temperature of about 1200° F.

2. The process of manufacturing hydrocarbon black which comprises directing a plurality of spaced wide sheets of hydrocarbon gas each of about ⅛″–¼″ thickness into a combustion chamber, simultaneously directing into the combustion chamber a sheet of air on each side of each gas sheet, adjusting the relative flow velocities and volume ratios of the air and gas sheets to maintain viscous streamline partial combustion and formation of solid hydrocarbon within each gas sheet at a distance of about 3½–6½ ft. from the point at which the air and gas sheets first contact within the chamber, intimately contacting the gaseous reaction products with a fine spray of water at a point located within a few inches beyond the point at which solid hydrocarbons are first formed within the flowing gas stream, and adjusting the volume of quenching water and the point of application thereof to the gas so as to preserve an acetone extractable content of 2%–5% in the solid hydrocarbon black recovered.

3. In a process of producing hydrocarbon black by the partial oxidation of hydrocarbons in an unobstructed enclosed space, the improvement comprising flowing a plurality of flattened, alternate, thin contacting sheets of air and hydrocarbon gas in the same direction through the said space, burning the said gas with between 50% and 80% of the theoretical amount of air required for the complete combustion of the said gas, maintaining the relative velocities of the respective gas and air streams within the ratios 1 to 1–2.5, intimately contacting the gaseous reaction products with a fine spray of water at a point spaced within a few inches beyond the point at which solid hydrocarbons first form within the gas sheets, and regulating the absolute velocity of the gas and the volume and temperature of the spray liquid so as to limit the time of exposure of the reacting gas to temperatures above 1200° F. to not substantially more than one-half second.

4. In the art of producing hydrocarbon black by partial oxidation of hydrocarbons in an unobstructed enclosed space, the improvement which comprises flowing a plurality of flattened alternate thin contacting sheets of air and hydrocarbon gas in the same direction through the said space, adjusting the relative flow velocities and volume ratios of the air and gas sheets to maintain viscous streamline partial combustion and formation of solid hydrocarbon within each gas sheet at a distance of about 3½–6½ ft. from the point at which the air and gas sheets first contact, rapidly quenching the solid hydrocarbons after their formation by intimately contacting the reacting gases with a finely sprayed quenching liquid at a point spaced 4½–8 ft. from the point at which the air and gas sheets first contact, and limiting the time of exposure of the solid hydrocarbon to temperatures in the range 1200° F.–2300° F. to a period of approximately $\frac{1}{10}$–$\frac{1}{10}$ second.

5. A method of producing hydrocarbon black by partial combustion of hydrocarbon gas, which comprises flowing a plurality of alternate thin flat sheets of the gas and air horizontally through a combustion zone while maintaining around each gas sheet a thin flame front in which complete combustion of only a portion of the gas occurs, contacting the flowing gas sheet with a spray of quenching water at a point located only a few inches beyond that point in the flame where solid hydrocarbon is first formed, adjusting the volume ratios of the air and gas so as to develop maximum flame temperatures in the range 2000°–2300° F., and adjusting the volume ratios of the gas and quenching water so as to preserve an acetone extractable content of 2%–5% in the solid hydrocarbon black recovered.

6. The method of producing hydrocarbon black which comprises providing a thin sheet of hydrocarbon gas flowing in uniform streamline relation, directing a thin sheet of air flowing in uniform streamline relation upon each side of the gas sheet, simultaneously directing the gas and air sheets in contact between parallel walls while subjecting the gas to partial combustion developing temperatures in the neighborhood of 2000°–2300° F., the velocities of the gas and air being such as to avoid the development of turbulence, and contacting the gas with a quenching liquid at a point located only a few inches beyond the point at which solid hydrocarbons are first formed in the gas streams to thereby preserve an acetone extractable content of 2%–5% in the solid hydrocarbon black recovered.

7. A process as defined in claim 6 in which the absolute velocity of the gas in the gas sheet approximates 14 ft. per second, and in which the point of application and volume of the quenching liquid is adjusted to insure against exposure of the hydrocarbon gas to temperatures above 1200° F.—for a period substantially in excess of one-half second.

8. The method of producing hydrocarbon black which comprises establishing a flowing non-turbulent stream of substantially undiluted hydrocarbon gas through a straight unobstructed path in an enclosed heating zone, applying heat to the hydrocarbon stream at such a rate as to raise its temperature to approximately 2000° F.–2350° F. while preventing contact of the major portion of the hydrocarbon with oxidizing agents and solid surfaces, intimately contacting the gas stream with a quenching liquid at a point located only a few inches beyond the point in the path at which solid hydrocarbons are first formed in the gas stream as a result of cracking, polymerization and dehydrogenation, and adjusting the relative volumes and temperatures of the gas and quenching liquid so as to preserve an acetone extractable content of 2%–5% in the solid hydrocarbon black product of the treatment.

GEORGE L. HELLER.
CARL W. SNOW.